(12) United States Patent
Lovell

(10) Patent No.: US 9,166,802 B2
(45) Date of Patent: Oct. 20, 2015

(54) COST INFLUENCED DOWNLOADING

(75) Inventor: Thomas Lovell, London (GB)

(73) Assignee: Nokia Technologies Oy, Espoo (FI)

( * ) Notice: Subject to any disclaimer, the term of this patent is extended or adjusted under 35 U.S.C. 154(b) by 278 days.

(21) Appl. No.: 12/999,598

(22) PCT Filed: Jun. 22, 2009

(86) PCT No.: PCT/IB2009/006020
§ 371 (c)(1),
(2), (4) Date: Feb. 23, 2011

(87) PCT Pub. No.: WO2009/153656
PCT Pub. Date: Dec. 23, 2009

(65) Prior Publication Data
US 2011/0264749 A1    Oct. 27, 2011

(30) Foreign Application Priority Data
Jun. 20, 2008 (GB) .................... 0811407.6

(51) Int. Cl.
*G06F 15/16* (2006.01)
*H04L 12/14* (2006.01)
*H04L 29/06* (2006.01)
(Continued)

(52) U.S. Cl.
CPC .............. *H04L 12/14* (2013.01); *H04L 12/145* (2013.01); *H04L 12/1485* (2013.01); *H04L 41/0896* (2013.01); *H04L 41/5003* (2013.01); *H04L 47/2408* (2013.01); *H04L 63/10* (2013.01)

(58) Field of Classification Search
CPC ......... H04L 29/06; H04L 29/08; H04L 12/14; H04L 63/10; H04L 41/5003; H04L 47/2408; H04L 41/0896

USPC ......................................................... 709/206
See application file for complete search history.

(56) References Cited

U.S. PATENT DOCUMENTS 5,878,223 A * 3/1999 Becker et al. ................. 709/223
6,275,858 B1 * 8/2001 Bates ................ G06F 17/30899
707/E17.119

(Continued)

FOREIGN PATENT DOCUMENTS

WO    2004/010643 A1    1/2004

OTHER PUBLICATIONS

International Search Report and Written Opinion received from corresponding Patent Cooperation Treaty Application No. PCT/IB200/1006020, Sep. 15, 2009, 15 pages.

(Continued)

*Primary Examiner* — John Breene
*Assistant Examiner* — Eyob Hagos
(74) *Attorney, Agent, or Firm* — Alston & Bird LLP

(57) ABSTRACT

The present invention provides a mobile communications device and a method of operating such a device to reduce data download costs incurred in downloading data from a bearer to which the mobile communications device is connected. The mobile communications device is capable of storing for a bearer to which the mobile communications device is configured to connect with, cost information relating to the cost of downloading data from that bearer. Also, the mobile communications device is capable of adapting the quantity of data downloaded to the mobile communications device from the bearer to which the mobile communications device is presently connected in dependence on the cost information for that bearer.

20 Claims, 7 Drawing Sheets

(51) Int. Cl.
*H04L 12/24* (2006.01)
*H04L 12/851* (2013.01)

(56) References Cited

U.S. PATENT DOCUMENTS

| | | | | |
|---|---|---|---|---|
| 6,941,310 | B2* | 9/2005 | Ahad | G06F 17/3048 |
| 7,320,131 | B1* | 1/2008 | O'Toole, Jr. | 718/104 |
| 7,613,154 | B2* | 11/2009 | Caspi | H04W 88/06 370/328 |
| 7,643,417 | B2* | 1/2010 | Van Nieuwenhuizen | 370/232 |
| 7,882,181 | B2* | 2/2011 | Kroman et al. | 709/206 |
| 7,925,212 | B2* | 4/2011 | Eisenbach | H04M 1/7253 370/328 |
| 7,961,714 | B1* | 6/2011 | Watson | H04L 12/66 370/352 |
| 8,145,222 | B2* | 3/2012 | Wormald et al. | 455/445 |
| 2002/0046052 | A1 | 4/2002 | Brown | |
| 2003/0145098 | A1* | 7/2003 | Litwin | 709/232 |
| 2003/0149737 | A1* | 8/2003 | Lambert et al. | 709/214 |
| 2003/0154256 | A1* | 8/2003 | Hadano et al. | 709/206 |
| 2003/0187806 | A1* | 10/2003 | Banerjee et al. | 705/400 |
| 2004/0107403 | A1 | 6/2004 | Tetzchner | |
| 2004/0215472 | A1* | 10/2004 | Gleckman | 705/1 |
| 2005/0136949 | A1* | 6/2005 | Barnes, Jr. | G06Q 10/1053 455/461 |
| 2005/0148359 | A1* | 7/2005 | Joeressen | H04L 29/06 455/552.1 |
| 2006/0293077 | A1* | 12/2006 | Aaltonen | H04M 1/72522 455/551 |
| 2007/0033224 | A1* | 2/2007 | Allen et al. | 707/104.1 |
| 2009/0088188 | A1* | 4/2009 | Wormald | H04W 4/18 455/466 |
| 2009/0138547 | A1* | 5/2009 | Boudreau | H04W 4/08 709/203 |
| 2009/0177732 | A1* | 7/2009 | Martin et al. | 709/203 |

OTHER PUBLICATIONS

"S60 Platform: IP Bearer Management", Forum Nokia Global Web Site, Feb. 22, 2007, 24 pages.

* cited by examiner

COST INFLUENCED DOWNLOADING

RELATED APPLICATION

This application is a National Stage Entry of International Application No. PCT/IB2009/006020 filed Jun. 22, 2009, which claims priority to Great Britain Application No. 0811407.6 filed Jun. 20, 2008.

TECHNICAL FIELD

Examples of the present invention relate to the field of mobile communications devices. Some examples relate to an apparatus and a method of operating an apparatus to reduce costs incurred from downloading data from a bearer to which the apparatus is connected.

BACKGROUND OF THE INVENTION

Known mobile communications devices are frequently capable of downloading data from a variety of different sources such as, for example, other mobile communications devices, the internet and personal computers. Additionally, such devices are often capable of downloading data from such sources via a variety of different connection types such as, for example, WiFi, GPRS, Bluetooth® and 3G. Further, a rich variety of different downloadable data can be available for download to known communications devices from these different sources via these different connections such as, for example, individual contact information, emails and websites.

SUMMARY OF THE INVENTION

A first example of the present invention provides apparatus comprising: at least one processor; and at least one memory including computer program code, the at least one memory and computer program code configured to, with the at least one processor, cause the apparatus at least to perform: determining, for at least one communication bearer with which the apparatus is configured to connect, cost information relating to the cost of downloading data from that bearer to the apparatus; and adapting the quantity of data to be downloaded to the apparatus from a bearer in dependence on the cost information for that bearer.

A second example of the invention provides a method comprising: determining, for at least one communication bearer with which an apparatus is configured to connect, cost information relating to the cost of downloading data from that bearer to the apparatus; and adapting the quantity of data to be downloaded to the apparatus from a bearer in dependence on the cost information for that bearer.

In further examples, the invention may include a computer program, a suite of computer programs, a computer readable storage medium, or any software arrangement for implementing the method of the second example. Aspects of the invention may also be carried out in hardware, or in a combination of software and hardware.

BRIEF DESCRIPTION OF THE DRAWINGS

A description of example embodiments of the present invention, presented by way of example only, will now be made with reference to the accompanying drawings, wherein:—

DESCRIPTION OF EMBODIMENTS

Figure 1:
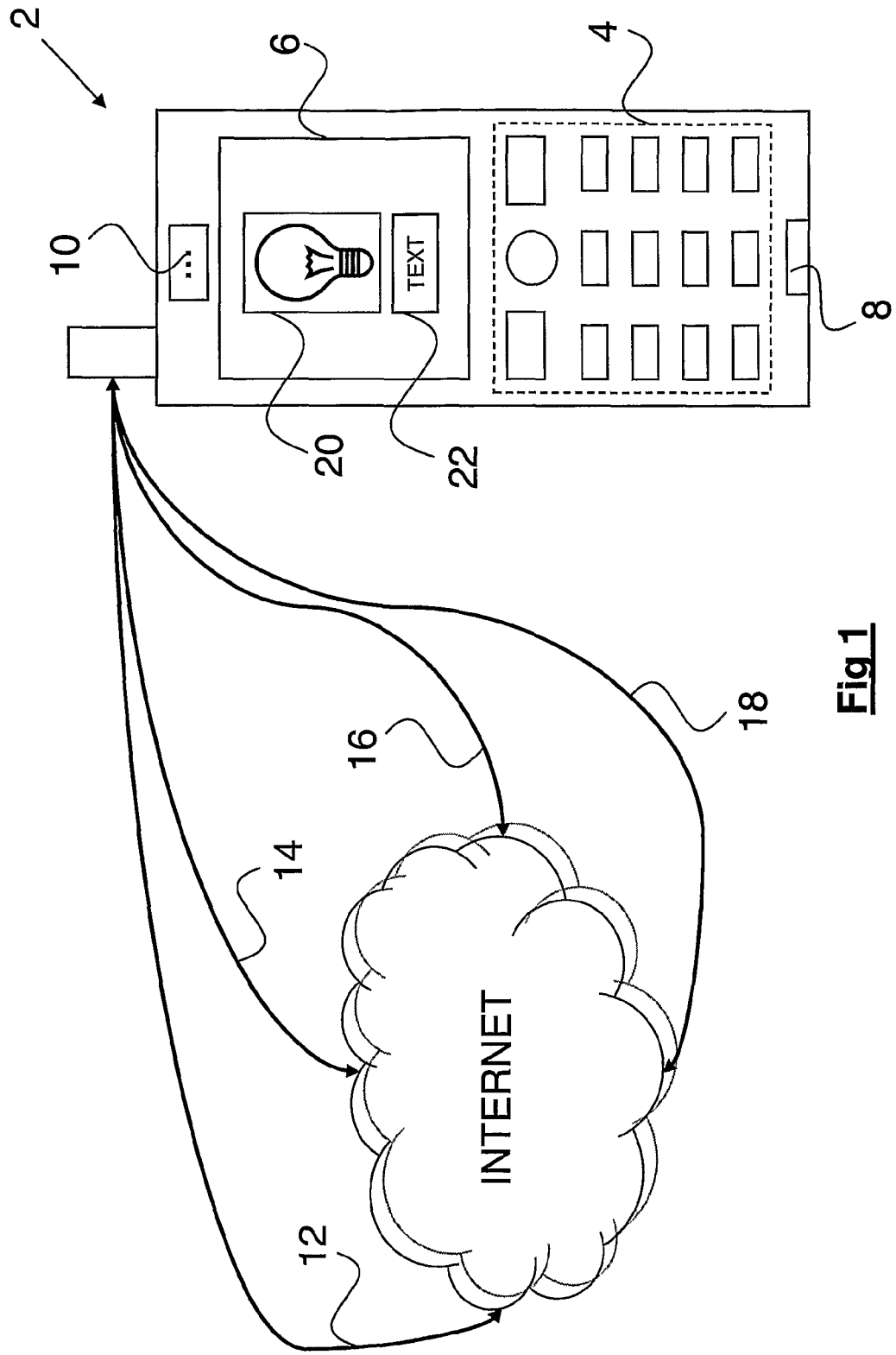
FIG. 1 is an environment within which a mobile communications device can operate in accordance with an example of the invention.

Some prior art devices are capable of downloading data from any one source via a number of different connection types. For example, a mobile communications device may be located so that it is able to connect to another mobile communications device via a Bluetooth® connection and to the internet via a GPRS connection or two different WiFi connections. In this example there are four available connections to data sources; each connection referred to as a 'bearer', and each connection to the internet is referred to as an 'IP bearer'.

It is frequently the case that the cost of downloading data varies significantly between different bearers, particularly when considering different IP bearers. Therefore, when a user of a mobile communication device wants to download particular data, it is desirable for the user to determine if multiple bearers are available to provide the data. In the instance where multiple bearers having the desired data are available, it is then desirable for the user to select the bearer that will allow the desired data to be downloaded for the least possible cost. Considering the above example where four bearers are available, if a user of the mobile communications device wants to download a website from the internet, the mobile communications device can automatically download the website from the cheapest available IP bearer. In other words the cheapest one of the GPRS connection and the two WiFi connections is selected.

The schemes by which downloading data is charged can vary between different bearers. For example, some bearers charge per byte of data downloaded, while some others charge a flat rate irrespective of the amount of data downloaded, sometimes specifying an upper limit. Some other bearers may provide for free transfer of data. In cases where data downloaded is charged per byte, it is often desirable to reduce the quantity of data downloaded to reduce the associated cost. That said, the user requires that the data conveys some information and it is crucial that the quantity of data is reduced in such a way that the data is still able to convey essential parts of that information.

A user may manually intervene after the mobile communications device has connected to a bearer and before downloading data, in order to reduce the potential cost of a download. The following illustrates an example of this.

A user of a mobile communications device needs to view a website in order to obtain information from the text of the website. When the mobile communications device connects to the internet it does so via a bearer that charges per byte of data downloaded, as that bearer is the one with the lowest download cost. In this example, on realising that the bearer charges per byte of data downloaded, the user of the mobile communications device manually disables automatic downloading of images as soon as possible. This manual intervention reduces the quantity of data downloaded by the cumulative size of each image not downloaded, and thereby reduces the download cost. Also, as the user is only interested in the website text, the essential information from the website is still conveyed to the user.

However, there can be problems with this manual intervention method of reducing download cost. The user may forget to disable image download completely or at least may forget to disable it before any images are downloaded automatically. It would be undesirable to permanently disable image download, as the next time the mobile communications device connects to the internet the bearer may charge a flat rate for downloading or not charge for downloading at all. In this case, the user would then have to manually enable image download which would further inconvenience the user.

It is also known to automatically adapt download behaviour of an internet browser running on a mobile communications device based on bearer connection bandwidth. For example, for a standard connection speed, a video clip is requested and downloaded by the browser at a standard quality. For a second connection speed which is lower than the standard speed, the browser automatically requests and downloads the same video clip at a reduced quality when instructed to download it by a user. Although this behaviour can reduce download cost as a side effect, it is principally aimed at reducing the download time rather than reducing the download cost. Accordingly, this behaviour does not take advantage of all possible cost reduction opportunities.

Further, it is known for a mobile communications device to automatically select a bearer based on cost. The following document provides one known implementation of this: 'S60 Platform: IP Bearer Management' version 1.0, 22 Feb. 2007, [http://www.forum.nokia.com]. However, selecting the cheapest bearer ensures that the download cost is minimised for only one common type of download behaviour.

Examples of the present invention can address the above-noted problems by adapting download behaviour of a mobile communications device in dependence on the cost of downloading data to the mobile communications device from a bearer to which the mobile communications device is connected. Some examples of the present invention can have the technical effect that data download costs are reduced.

Some example embodiments of the invention to be discussed are based on a mobile communications device platform, described next with respect to FIGS. 1 to 4.

FIG. 1 represents an example environment within which a smartphone 2 is intended to operate. The smartphone 2 comprises a keypad 4, a display screen 6, a microphone 8 and a speaker 10. The smartphone 2 is capable of being operated by a user to perform a variety of different functions, such as, for example, hosting a telephone call, browsing the internet or sending an email. In FIG. 1, the example smartphone 2 is located so that it is capable of connecting to the internet via four different connections or IP bearers, 12, 14, 16 and 18. When the smartphone 2 is connected to the internet via one of the IP bearers 12 to 18, the smartphone 2 is capable of downloading data from the internet. For example, the smartphone 2 is capable of downloading data in order to display an image 20 and text 22 of a website on the display screen 6.

Figure 2:
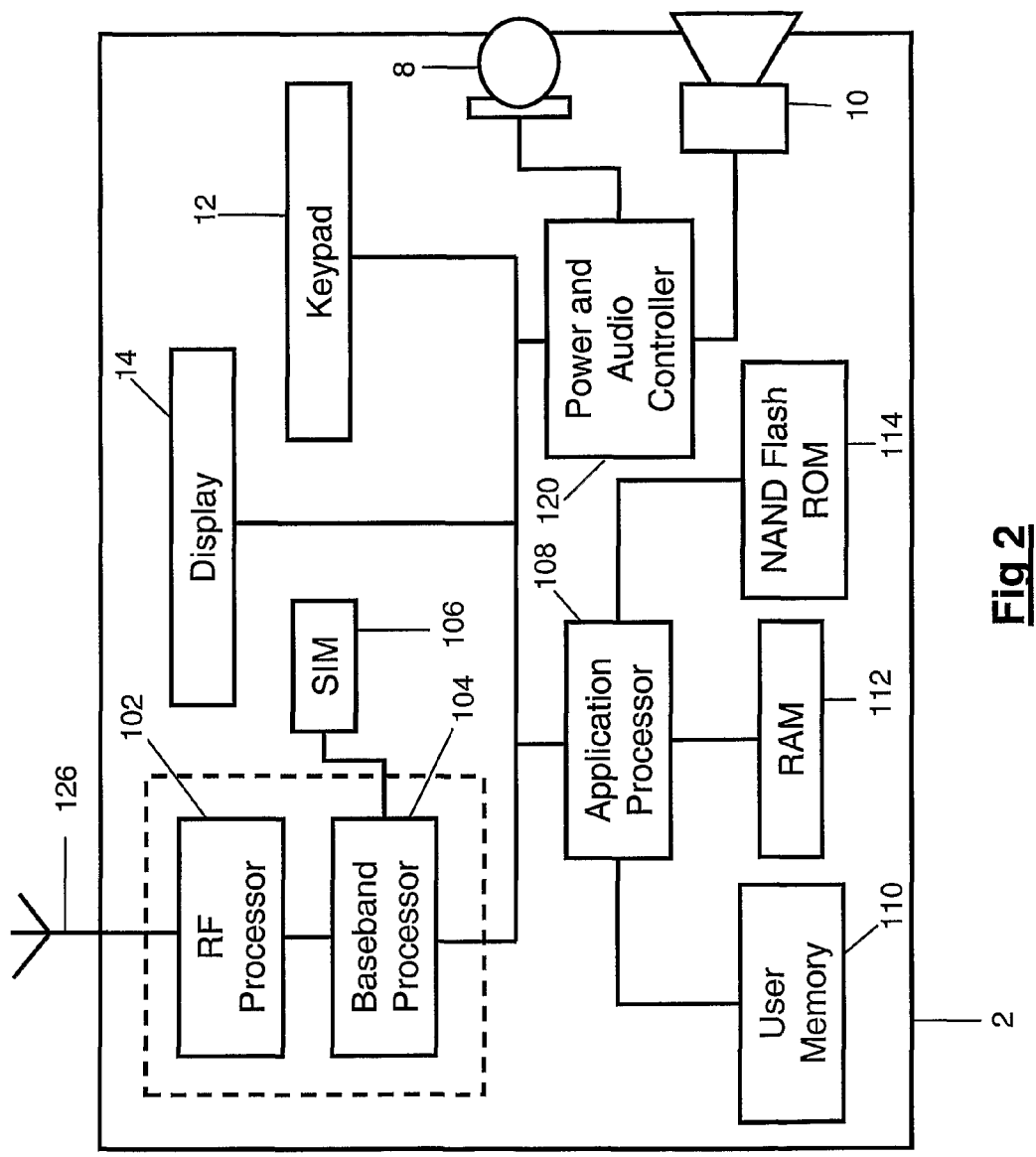
FIG. 2 is a schematic view of the internal hardware elements of the mobile communications device of FIG. 1.

FIG. 2 shows a schematic view of some of the internal hardware elements of the smartphone 2. With reference to FIG. 2, the smartphone 2 comprises hardware to perform telephony functions, together with an application processor and corresponding support hardware to enable the phone to have other functions which are desired by a smartphone, such as messaging, internet browsing, email functions and the like. In the example shown in FIG. 2 the telephony hardware is represented by the RF processor 102 which provides an RF signal to antenna 126 for the transmission of telephony signals, and the receipt therefrom. Additionally provided is baseband processor 104, which provides signals to and receives signals from the RF Processor 102. The baseband processor 104 also interacts with a subscriber identity module 106.

In the example of FIG. 2 the keypad 12 and the display 14 are controlled by an application processor 108, which may be a separate integrated circuit from the baseband processor 104 and RF processor 102, or alternatively the processors may be provided on a single chip. A power and audio controller 120 is provided to supply power from a battery to the telephony subsystem, the application processor, and the other hardware. Additionally, the power and audio controller 120 also controls input from the microphone 8, and audio output via the speaker 10.

In order for the application processor 108 to operate, various different types of memory are provided in this example. Firstly, the application processor 108 is provided with some Random Access Memory (RAM) 112 into which data and program code can be written and read from at will. Code placed anywhere in RAM can be executed by the application processor 108 from the RAM.

Additionally, a separate user memory 110 is provided in the example of FIG. 2, which is used to store user data, such as user application programs (typically higher layer application programs which determine the functionality of the device), as well as user data files, and the like.

Operating system code is stored in a Read-Only Memory, which in this example is NAND Flash ROM 114. The ROM may also store other software programs, such as application programs. Further applications, which may be added to the smartphone by the user, may be stored in the user memory 110.

Figure 3:
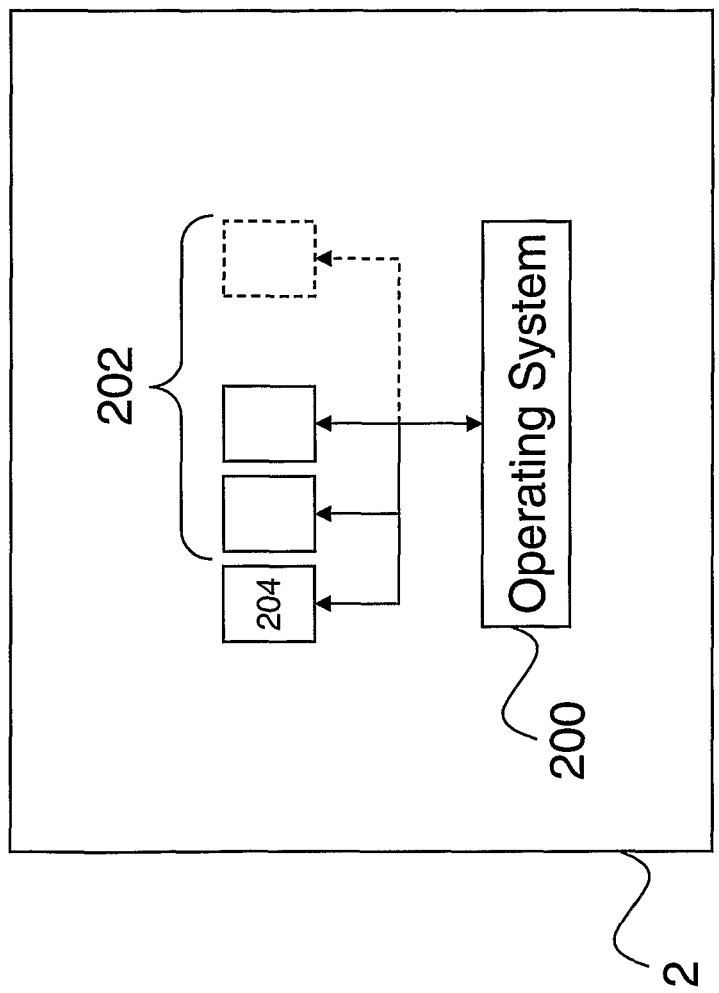
FIG. 3 is a schematic view of the software content stored on the internal hardware elements of the mobile communications device of FIG. 1.

FIG. 3 illustrates one example of software content that is stored on the internal hardware elements of the smartphone 2. More specifically, an operating system 200 is shown operating with a number of different application programs 202 and 204 wherein, the application program 204 is specified as an internet browser. In addition to internet browser 204 the smartphone 2 of FIG. 2 comprises a number of other application programs 202 that enable different aspects of the smartphone's functionality.

Figure 4:
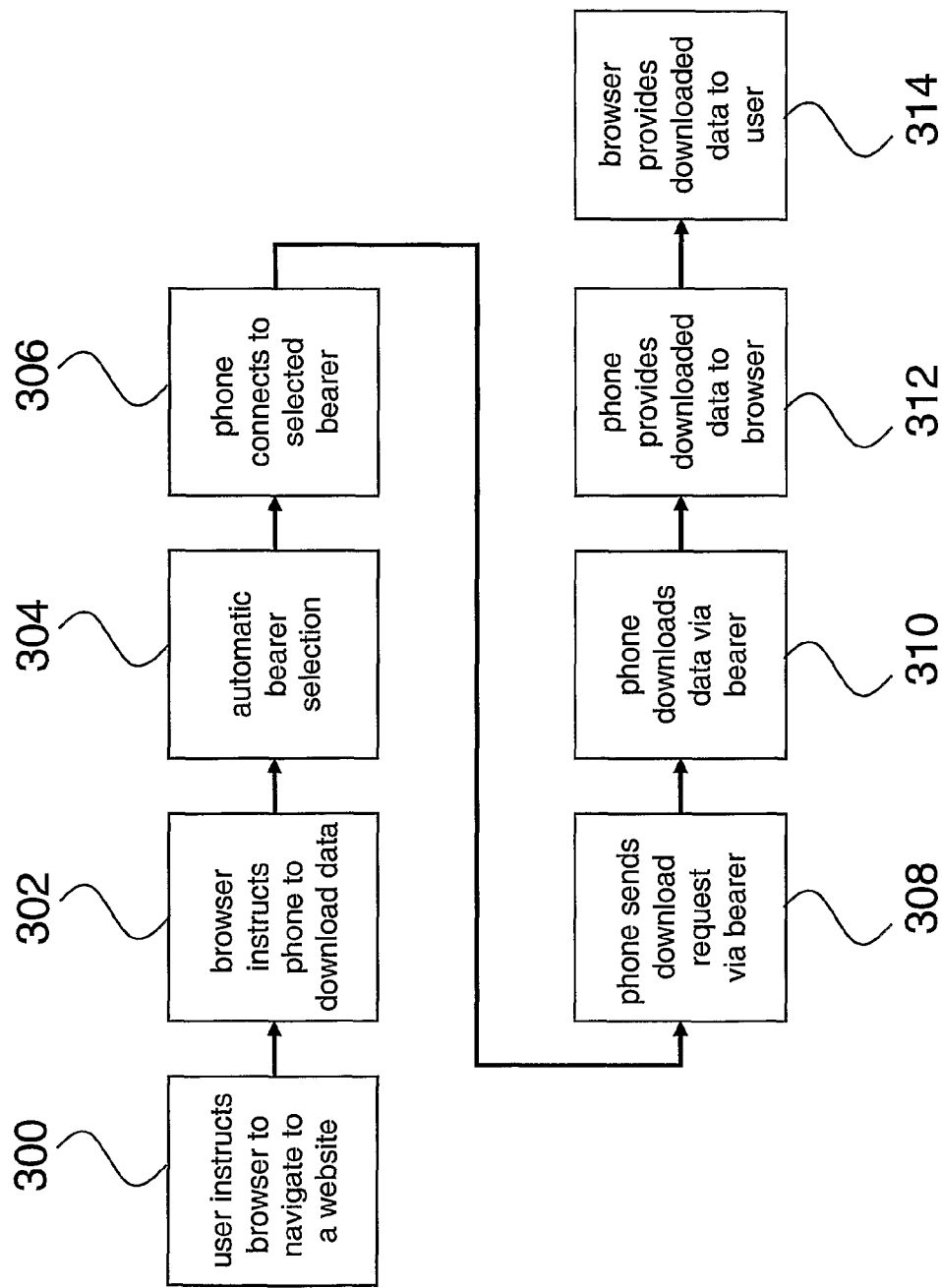
FIG. 4 is a flow diagram illustrating an example operation of the mobile communications device of FIG. 1.

In this example, execution of the software content enables the smartphone 2 to perform its many different functions. As briefly mentioned above with reference to FIG. 1, one of the smartphone's functions is to download data from the internet via one of the available IP bearers 12 to 18. In order for the smartphone 2 of this example to download data from the internet the operating system 200 and, the application programs 202 and 204 cooperate to perform a number of specific tasks. It should be noted that the exact software and hardware construction of the smartphone 2 may vary significantly between different models and designs. Consequently, the specific tasks performed will vary between different designs as will the sequence in which those tasks are executed. FIG. 4 is a flow diagram which illustrates one example set of tasks and one example sequence in which they are performed. FIG. 4 will now be described in detail wherein the flow diagram disclosed therein defines the operation of the example smartphone 2 as discussed above with reference to FIGS. 1 to 3.

In the example flow diagram of FIG. 4, in block 300, a user of the smartphone 2 instructs the internet browser 204 stored on the smartphone 2 to navigate to a particular website on the internet. In block 302, the internet browser 204 instructs the operating system 200 of the phone to request data corresponding to the desired website from the web server hosting the desired website. The operating system 200 controls this operation by providing the internet browser 204 with access to the smartphone's hardware functionality, however numerous other application programs are executed in this example to perform smaller aspects of the overall operation. One of the first of these smaller operations to execute is automatic bearer selection which is performed in block 304: the smartphone 2 determines which bearers are available and suitable for performing the desired operation and selects the most suitable one according to cost. In the present example, the bearer should be an IP bearer to carry out the desired data transfer. As was mentioned with reference to FIG. 1, four IP bearers, 12, 14, 16 and 18 are available to the smartphone 2. In the instant example, IP bearer 12 has a lower cost than IP bearers 14, 16 and 18, so in block 304 automatic bearer selection selects IP bearer 12. In this example IP bearer 12 charges the user per byte of data downloaded.

In block 306 of the example flow diagram, the operating system 200 in conjunction with the application programs 202 connects the smartphone 2 with the IP bearer 12 and processing progresses to block 308. At block 308, the smartphone 2 sends a download request to the web server hosting the desired website via the IP bearer 12. The download request is sent according to the internet browser's download settings; for example, images may be requested for download automatically if the relevant setting is active. The web server responds to the download request by sending the requested website data to the smartphone 2. In block 310, the smartphone 2 downloads the sent data from the web server via the IP bearer 12. This download operation is handled by the operating system 200 in conjunction with the application programs 202. In block 312, the operating system 200 and the application programs 202 deliver the downloaded data to the internet browser 204. Finally, in block 314, the internet browser 204 delivers the downloaded data to the user in a suitable format. In this example, the downloaded data represents a website and the internet browser 204 will display website text and website images to the user via the display screen 6, as illustrated in FIG. 1.

Further details of example embodiments of the invention will now be discussed, some of which may address the problems noted earlier.

Figure 5:
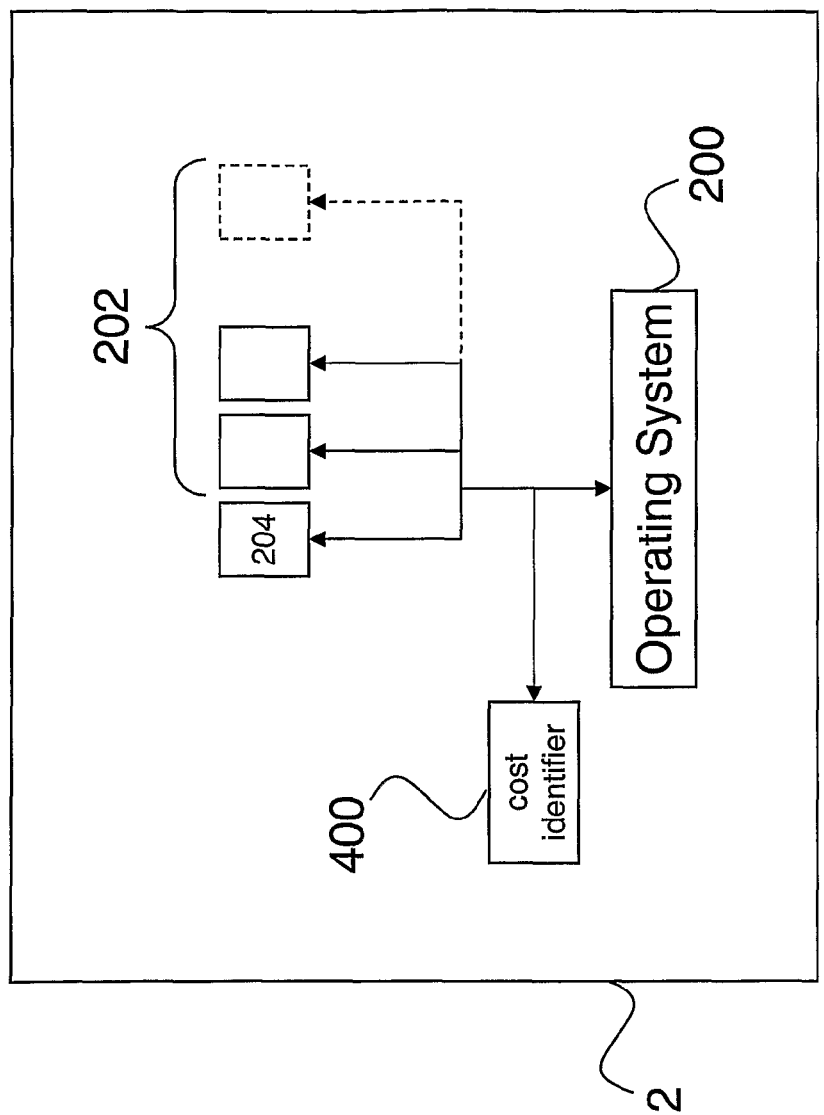
FIG. 5 is a schematic view of the software content stored on the internal hardware elements of a mobile communications device arranged according to an embodiment of the present invention.

FIG. 5 illustrates how the software content stored on the internal hardware elements of the example smartphone 2 is modified according to an example embodiment of the present invention. A cost identifier 400 is provided and is arranged for connection and communication with the operating system 200 and the application programs 202, 204. The browser 204 of this example is capable of adjusting its download settings to adapt which types of data are downloaded automatically and which are only downloaded at the specific request of a user. Moreover, the example browser 204 adapts the download settings in dependence on the data download cost of the IP bearer from which the smartphone 2 downloads data.

In the example embodiment, the cost identifier 400 stores cost information for a plurality of bearers to which the smartphone 2 is configured to connect. In this example, in order for a possible bearer to qualify as a configured bearer the smartphone 2 should be interoperable with the bearer and the smartphone 2 should be geographically located within communication range of the bearer. In this example, for the plurality of configured bearers, one of two different cost information values is assigned; either 'FREE', if the bearer does not charge for data download or charges a flat rate; or 'CHARGED PER BYTE', if the bearer charges per byte of data downloaded. In the example, the cost information stored on the cost identifier 400 is dynamically obtained by the smartphone 2 when the smartphone 2 comes within communication range of each bearer. For the purposes of this embodiment the bearer is an IP bearer.

In the example, an IP bearer's cost information is made available by the cost identifier 400 to the internet browser 204 so that, once the smartphone 2 has connected to the IP bearer, the browser 204 can query the cost identifier 400 and adapt its download settings accordingly before the phone sends a corresponding download request. More specifically, if the browser 204 queries the download adapter 400 to discover that the cost information relating to the IP bearer to which the smartphone 2 is connected has a value of 'FREE' in this example embodiment, the browser enables its automatic image downloading setting. Accordingly, download requests sent from the smartphone 2 automatically request image data. Alternatively, if the browser 204 discovers that the cost information value is 'CHARGED PER BYTE', the browser in this embodiment disables its automatic image downloading setting. Accordingly, download requests sent from the smartphone 2 do not automatically request image data.

Figure 6:
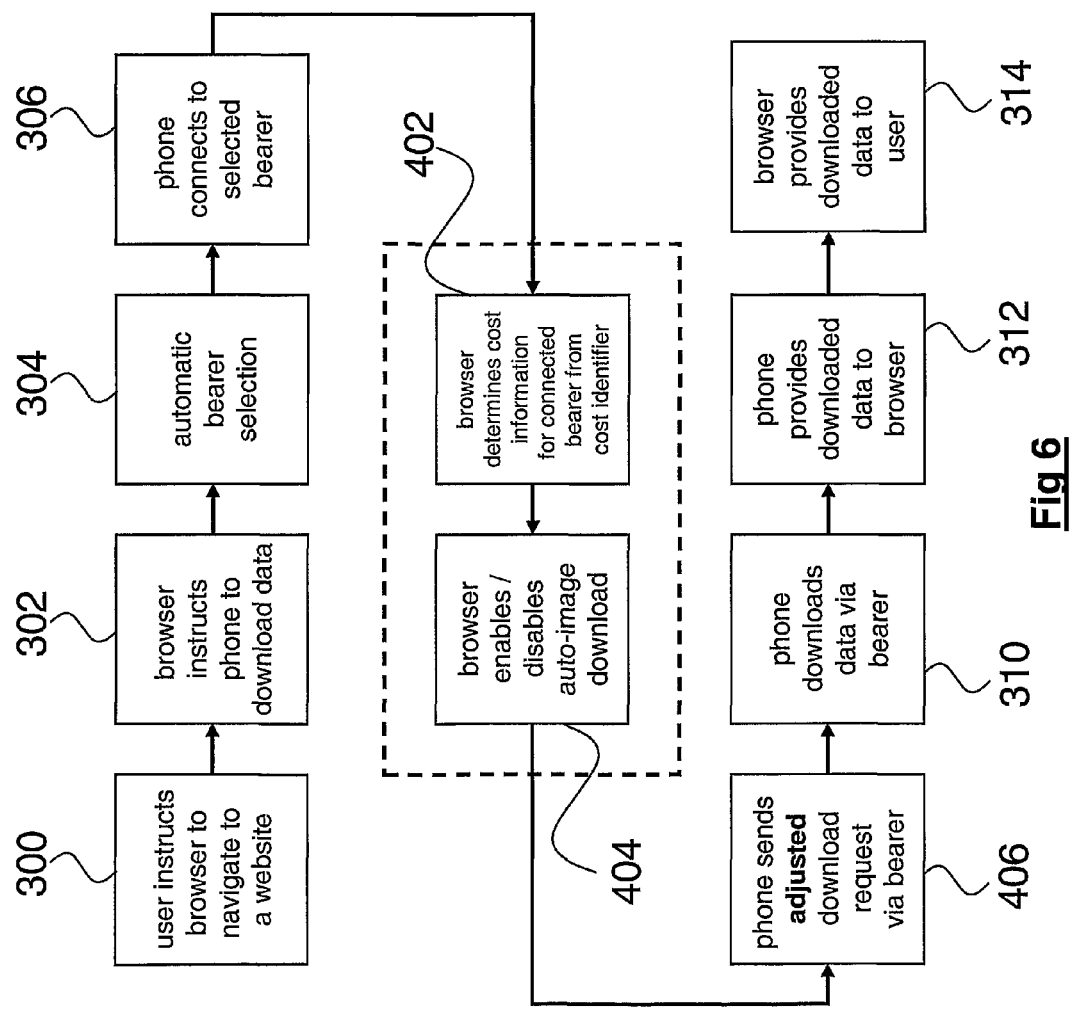
FIG. 6 is a flow diagram illustrating the operation of the mobile communications device arranged according to the embodiment of FIG. 5.

FIG. 6 represents the operation of the smartphone 2 when modified according to an example embodiment of the present invention. FIG. 6 will now be discussed in detail.

Processing from block 300 to block 306 may proceed substantially as described with reference to FIG. 4. Once the phone connects to the IP bearer 12 processing moves from block 306 to 402. At block 402, the internet browser 204 queries the cost identifier 400 to determine the value of the cost information relating to the IP bearer 12, following which processing progresses to block 404. At block 404, the browser 204 in the example embodiment either enables automatic image downloading if the cost information value is 'FREE' or, disables automatic image downloading if the cost information value is 'CHARGED PER BYTE'. Enabling or disabling the browser's automatic image downloading setting causes the download request sent from the smartphone 2 to automatically include or omit requests for image data. Accordingly, once the browser's image download setting has been adjusted in block 404 of this embodiment, processing progresses to block 406 wherein a corresponding adjusted download request is sent from the smartphone 2 to the web server hosting the desired website via the IP bearer 12. Once the adjusted download request is sent from the smartphone 2 processing progresses to block 310 from which the operation of the smartphone 2 may proceed substantially as described above with reference to FIG. 4.

In block 314 of this example, the browser provides downloaded data to the user which contains image data in dependence on the value of the cost information relating to the IP bearer 12. Therefore, if the IP bearer 12 of this example does not charge for data download or charges a flat rate, the website presented to the user on the display screen 6 will contain both text and images. However, if the IP bearer 12 charges per byte of data downloaded, the website presented to the user will contain text and not images. In this latter case the user can specifically select each image on the website that they wish to be downloaded and, if the user selects an image the smartphone 2 will download image data in the example embodiment. The result of the modified operation illustrated in FIG. 6 is that the quantity of data downloaded is less in certain embodiments when compared to the operation illustrated in FIG. 4 when the cost of downloading data is charged per byte downloaded. Moreover, as the quantity of data downloaded is less under these circumstances, the cost of the data download is reduced. In the instance when the user does actually want to view a subset of the images contained within the website, the user can select each image to download it on an individual basis. Although this may increase the cost of the data download, only the subset of images that are of interest to the user are downloaded so the cost will be reduced when compared to the case when all images are downloaded.

In an optional extension to the example embodiment just described, the browser enables or disables the automatic refresh of website pages having automatic refresh enabled in dependence on the cost information value. In another optional extension, the frequency with which the website is configured to automatically refresh is adjusted in dependence on the cost information value. For example, consider the scenario when a user instructs a browser to navigate to a website having automatic refresh configured. In the first optional extension to the example embodiment, the browser can enable the automatic refresh setting if a connected IP bearer's cost information value is 'FREE' or, disable the setting if the value is 'CHARGED PER BYTE'. In the second optional extension to the preferred embodiment, download behaviour may be unchanged if a connected IP bearer's cost information value is 'FREE'. However, if the value is 'CHARGED PER BYTE', the automatic refresh setting can be enabled but the frequency at which the website page refreshes automatically is reduced. As the refresh frequency is reduced when the cost information value is 'CHARGED PER BYTE' the corresponding quantity of data downloaded in a given period may also be reduced. Therefore, the download cost can be reduced as well by virtue of the optional extensions. It is noted that the user can be permitted to manually refresh the website at anytime. In any embodiment of the invention, it may be desirable to allow the user to interact with the apparatus in order to influence the download behaviour. For example, the user may be asked whether he wishes to proceed with a particular mode of download or manually select another.

Figure 7:
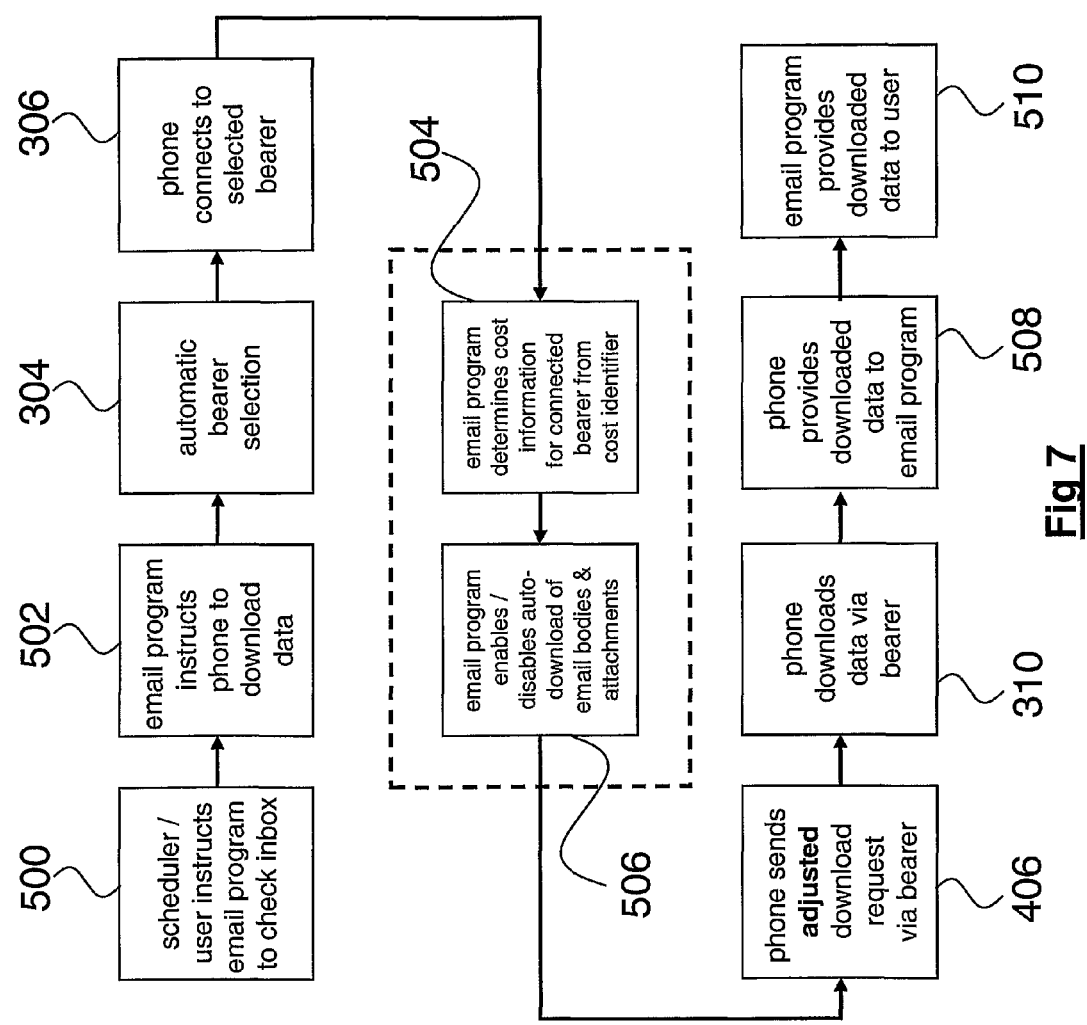
FIG. 7 is a flow diagram illustrating the operation of the mobile communications device arranged according to an alternative embodiment of the present invention.

Modifications can be made to the example embodiment of the present invention to create an alternative example embodiment. Accordingly, in the alternative embodiment, the application program 204 is an email program that enables or disables the automatic download of email bodies and attachments in dependence on the connected IP bearer's cost information value. The operation of the alternative example embodiment will now be described with reference to the flow diagram of FIG. 7.

Processing begins at block 500 wherein the email program is instructed to check the inbox of an email account for new emails. This instruction may come from a number of different sources such as, for example, a user of the smartphone 2 who wishes to check for new emails or, the smartphone 2 itself which periodically checks for new emails according to a pre-determined schedule. At block 502 of the alternative embodiment, the email program instructs the smartphone 2 to download email data relating to new emails from the mail server (not shown) hosting the email account. Processing from block 502 progresses to blocks 304 and 306 as discussed above with reference to FIGS. 4 and 6.

Once the smartphone 2 has connected to IP bearer 12 in block 306 of the alternative embodiment, processing progresses to block 504 wherein the email program queries the cost identifier 400 to determine the value of the cost information relating to the IP bearer 12. At block 506, the email program either enables automatic downloading of email bodies and attachments if the cost information value is 'FREE' or, disables automatic downloading of email bodies and attachments if the cost information value is 'CHARGED PER BYTE'. Enabling or disabling the automatic downloading of email bodies and attachments setting causes the download request sent from the smartphone 2 to automatically include or omit requests for email body and attachment data.

Accordingly, once the email program's relevant download setting has been adjusted in block 506 of this embodiment, processing progresses to block 406 wherein a corresponding adjusted download request is sent from the smartphone 2 via the IP bearer 12. Once the adjusted download request is sent, processing progresses to block 310 from which the operation of the smartphone 2 is substantially the same as described above with reference to FIGS. 4 and 6, the main difference being that rather than a browser receiving downloaded data and presenting corresponding website content to the user, the email program receives the downloaded data and presents corresponding email data to the user in this embodiment. In particular, this involves updating the email inbox to include download details of any new emails.

Due to the above described operation of the alternative embodiment of the present invention, when the connected IP bearer's cost information value is 'CHARGED PER BYTE' the bodies and attachments of any new messages are not automatically downloaded. Therefore, the quantity of data automatically downloaded can be less when compared to the case when the cost information value is 'FREE' and thus, the associated download cost is reduced. In cases where the user only receives email header information but actually wants the corresponding email body and any attachments, the user can specifically instruct the email program to download them.

In an optional extension to the alternative embodiment of the present invention the email program can be configured to actively download previously undownloaded email bodies and attachments corresponding to previously downloaded email headers. More specifically, when the email program performs an inbox check that results in email headers being downloaded without their corresponding bodies or attachments, the email program can periodically query the cost identifier 400 to determine if an IP bearer with a 'FREE' cost information value is available. In the event that an IP bearer having a cost information value of 'FREE' does become available, the email program can automatically download the previously undownloaded email bodies and attachments to the smartphone 2.

In the embodiments of the present invention, the precise form of the cost information of a bearer is not limited to that described with reference to the specifically described embodiments. Cost information values can be in the form of any number of discrete variables (such as 'FREE' or 'CHARGED PER BYTE') or can be in the form of a scale of continuous values. In the latter case, rather than each continuous value corresponding to a particular download behaviour, one or a number of threshold values may be defined that partition the scale of continuous values into a number of adjacent zones and download behaviours can be assigned to each zone. For example, in one embodiment where one threshold value is defined on the continuous scale, a browser will enable automatic downloading of images from the internet for those IP bearers having a cost information value less than or equal to the threshold value. Conversely, the browser will disable automatic downloading of images for those IP bearers having a cost information value which is greater than the threshold value. Providing for multiple zones and thresholds can have the technical effect that different charging regimes can be taken into account and the download behaviour can be varied in a flexible manner as appropriate.

In the described embodiments a plurality of configured bearers inform the smartphone of their cost information when the smartphone moves into communication range of the respective bearer. However, in some embodiments of the invention, at least some cost information may be assigned by a user of the smartphone during use or by the manufacturer of the smartphone before sale. Alternatively, or in addition, certain types of bearer can be known by a communications apparatus to have certain charging structures, so the only information that the apparatus should learn from the bearer itself is its type; the specific information on charging structures can then be looked up, for example, in a stored data structure recording the various charging structures of the various bearer types. In general, any combination of pre-stored and dynamically derived information relating to download cost is considered to be included within the scope of embodiments of the invention. Under some of these alternative regimes, the cost identifier can have a list of bearers that the user and/or manufacturer may know to be interoperable with the smartphone. This list can also include corresponding cost information for each of the bearers listed so that an internet browser or an email program can query the cost identifier to determine cost information for a connected bearer.

In some examples of the invention, the quality of images requested for download could be adjusted in dependence on the cost information value of a connected bearer. In general, in order for such a technique to conform to the inventive concept of the present invention, the technique used can adapt the quantity of data downloaded to vary the download costs in dependence on the cost information value of a connected bearer. Allowing for different adaptation techniques can have the technical effect of reducing download costs for a variety of types of download data.

In embodiments of the invention an internet browser or an email program can be used in carrying out the invention. It is within the scope of the present invention that other types of application program may be used; for example, a media player program would be equally suitable, or a stand-alone application could be used to operate in conjunction with other applications to adapt their download behaviour.

In various embodiments of the invention, the processor may be provided by any suitable means, and may comprise but are not limited to (1) one or more microprocessors, (2) one or more processor(s) with accompanying digital signal processor(s), (3) one or more processor(s) without accompanying digital signal processor(s), (3) one or more special-purpose computer chips, (4) one or more field-programmable gate arrays (FPGAS), (5) one or more controllers, (6) one or more application-specific integrated circuits (ASICS), (7) one or more combinations of hardware/firmware, or (7) one or more computer(s). The memory may also be provided by any suitable means, and may include one or more types of memory (e.g., ROM or RAM), programmed in such a way to carry out the inventive function.

The ability of some embodiments of the invention to respond dynamically to the conditions available to the apparatus can provide the technical effect of allowing the apparatus to perform download behaviour tailored to the bearers currently available and to minimise the costs incurred from downloading data.

Various modifications, including additions and deletions, will be apparent to the skilled person to provide further embodiments, any and all of which are intended to fall within the appended claims. It will be understood that any combinations of the features and examples of the described embodiments of the invention may be made within the scope of the invention.

The invention claimed is:

1. Apparatus comprising:
at least one processor; and at least one memory including computer program code,
the at least one memory and computer program code configured to, with the at least one processor, cause the apparatus at least to:
determine, for at least one communication bearer with which the apparatus is configured to connect, cost information relating to the cost of downloading data from that bearer to the apparatus;
define a plurality of threshold cost values that partition a scale of continuous cost values into a plurality of cost dependent zones;
assign download behaviors for each of the cost dependent zones, wherein the assignment of download behaviors comprises, for at least one of the plurality of cost dependent zones, defining a threshold value on the scale of continuous cost values such that an automatic downloading of images is enabled from a communication bearer having a cost information value less than or equal to the threshold value, and an automatic downloading of images is disabled from a communication bearer having a cost information value greater than the threshold value;
adapt a quantity of data to be downloaded to the apparatus from a first communication bearer in dependence on download behavior assigned to each cost dependent zone in which the cost information for the first communication bearer is associated,
wherein adapt the quantity of data to be downloaded comprises, in an instance in which the quantity downloaded is a first portion of the data,
subsequently periodically querying one or more additional bearers;
identifying a second communication bearer from which a second portion of the data is downloadable at a reduced cost; and
downloading the second portion from the second communication bearer.

2. Apparatus according to claim 1 wherein the memory and computer program code is configured, with the processor, to cause the apparatus to store the cost information in the apparatus.

3. Apparatus according to claim 1 wherein the cost information comprises one of a plurality of different possible discrete values, and wherein adapting the quantity of data to be downloaded comprises adapting the quantity of data downloaded in dependence on the discrete value.

4. Apparatus according to claim 1 wherein the cost information comprises a continuous value from a scale of possible continuous values and at least one threshold value is defined to partition the scale of possible continuous cost information values into a number of zones and wherein adapting the quantity of data to be downloaded comprises adapting the quantity of data downloaded in dependence on the zone into which the cost information falls.

5. Apparatus according to claim 1 wherein adapting the quantity of data to be downloaded comprises at least one of disable and enable of automatic requests to download images.

6. Apparatus according to claim 1 wherein adapting the quantity of data to be downloaded comprises adapting the frequency at which an automatic request to refresh downloaded data is made.

7. Apparatus according to claim 1 wherein adapting the quantity of data to be downloaded comprises automatically requesting download of header information only for the data to be downloaded.

8. Apparatus according to claim 1 wherein adapting the quantity of data to be downloaded is performed by an application program running on the apparatus.

9. Apparatus according to claim 1 wherein the data to be downloaded comprises website data.

10. Apparatus according to claim 1 wherein the data to be downloaded comprises email data.

11. Apparatus according to claim 10 wherein an email program automatically requests download of header data only of the email data when the apparatus is connected to the first communication bearer, and subsequently automatically requests download of corresponding email body data and email attachment data when the mobile communication device is capable of communication with the second communication bearer, when it is cheaper to download data via the second communication bearer than via the first communication bearer.

12. A method comprising:
determining, for at least one communication bearer with which an apparatus is configured to connect, cost information relating to the cost of downloading data from that bearer to the apparatus;
defining a plurality of threshold cost values that partition a scale of continuous cost values into a plurality of cost dependent zones;
assigning download behaviors for each of the cost dependent zones, wherein the assignment of download behaviors comprises, for at least one of the plurality of cost dependent zones, defining a threshold value on the scale of continuous cost values such that an automatic downloading of images is enabled from a communication bearer having a cost information value less than or equal to the threshold value, and an automatic downloading of images is disabled from a communication bearer having a cost information value greater than the threshold value;
adapting, utilizing a processor, the quantity of data to be downloaded to the apparatus from a first communication bearer in dependence on download behavior assigned to each cost dependent zone in which the cost information for the first communication bearer is associated,
wherein adapting the quantity of data to be downloaded comprises, in an instance in which the quantity downloaded is a first portion of the data,
subsequently periodically querying one or more additional bearers;
identifying a second communication bearer from which a second portion of the data is downloadable at a reduced cost; and
downloading the second portion from the second communication bearer.

13. A method according to claim 12 wherein the cost information comprises one of a plurality of different possible discrete values, and wherein adapting the quantity of data to be downloaded comprises adapting the quantity of data downloaded in dependence on the discrete value.

14. A method according to claim 12 wherein the cost information comprises a continuous value from a scale of possible continuous values and at least one threshold value is defined to partition the scale of possible continuous cost information values into a number of zones and wherein adapting the quantity of data to be downloaded comprises adapting the quantity of data downloaded in dependence on the zone into which the cost information falls.

15. A method according to claim 12 wherein adapting the quantity of data to be downloaded comprises at least one of disabling and enabling automatic requests to download images.

16. A method according to claim 12 wherein adapting the quantity of data to be downloaded comprises adapting the frequency at which an automatic request to refresh downloaded data is made.

17. A method according to claim 12 wherein the data to be downloaded comprises website data.

18. A method according to claim 12 wherein adapting the quantity of data to be downloaded comprises automatically requesting download of header data only of email data.

19. A method according to claim 18 wherein an email program automatically requests download of header data only of the email data when the apparatus is connected to the first communication bearer, and subsequently automatically requests download of corresponding email body data and email attachment data when the mobile communication device is capable of communication with the second communication bearer, when it is cheaper to download data via the second communication bearer than via the first communication bearer.

20. A non-transitory computer program product comprising at least one computer-readable storage medium having computer-executable program code portions stored therein, the computer-executable program code portions comprising: program code instructions for performing the method of claim 12.

* * * * *